Patented June 27, 1933

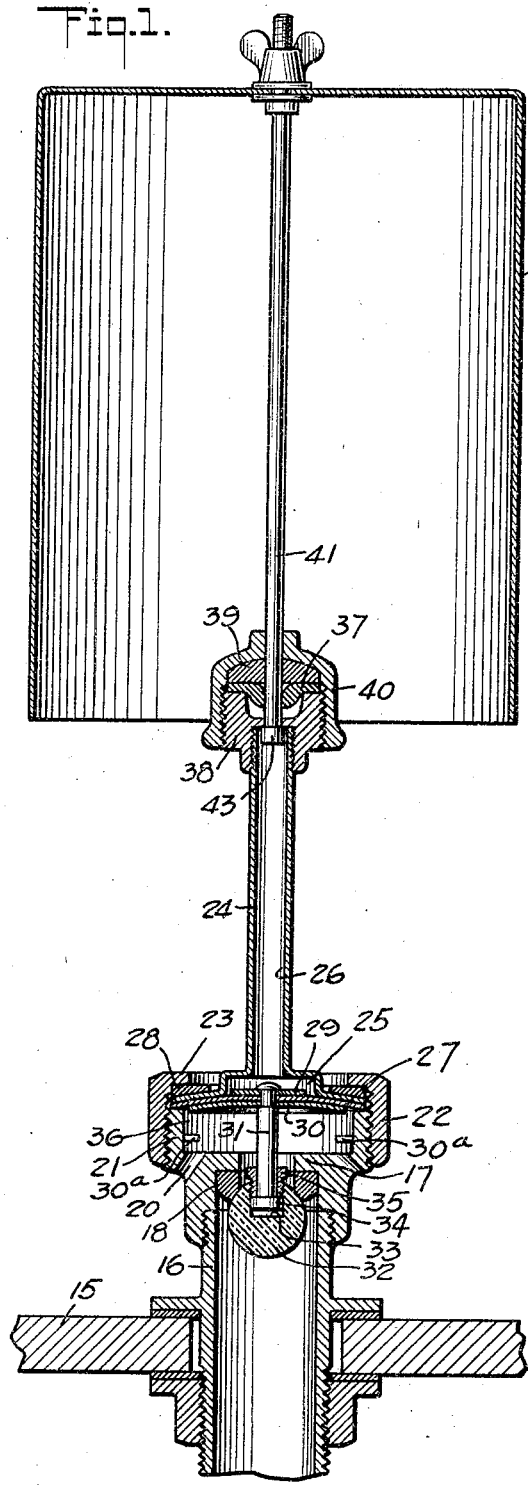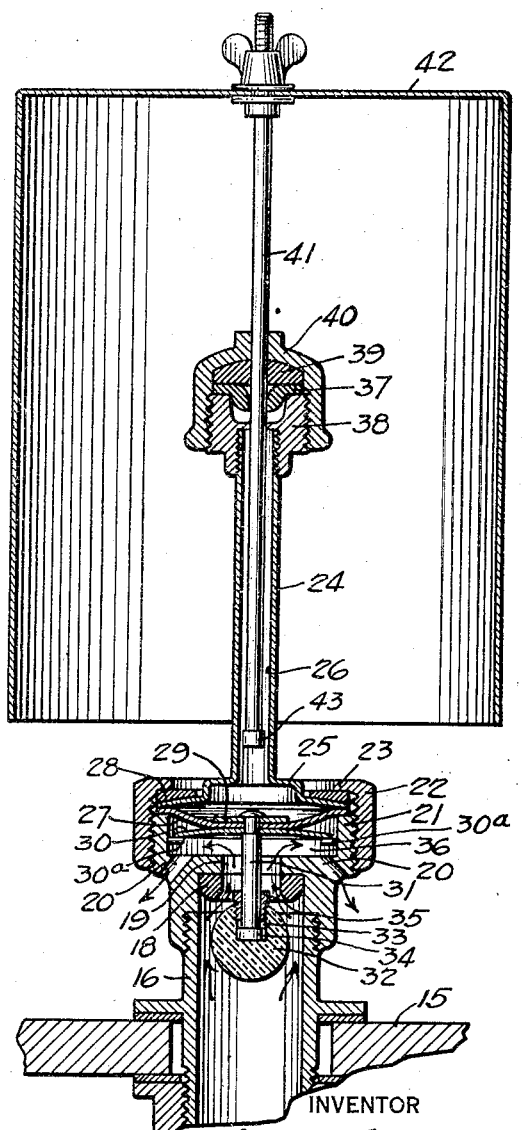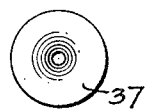

1,915,716

UNITED STATES PATENT OFFICE

ANDREW C. BRADSHAW, OF LOS ANGELES, CALIFORNIA

VALVE AND OPERATING MECHANISM THEREFOR

Application filed September 30, 1929. Serial No. 396,294.

My invention relates to valves and mechanisms for operating the same, and it has particular reference, although not necessarily, to float and flushing valves for flush tanks, and to a float operated mechanism for automatically controlling the filling of the tank subsequent to the emptying thereof.

It is a purpose of my invention to provide a mechanism for operating float valves which is characterized by the provision of a fluid tight chamber one wall of which is movable and operatively connected to a valve so that when it is moved in the chamber the fluid will be placed under such pressure as to actuate the movable wall and thereby effect operation of the valve.

It is also a purpose of my invention to provide in a valve operating mechanism a novel form of gasket which in its association with that member movable in the chamber to increase the fluid pressure, operates to effect a fluid tight seal about the member, and in consequence of which any increase in fluid pressure about the chamber will not be lost so that proper operation of the valve is insured.

A further purpose of my invention is the provision of a valve of novel construction, in which, in its association with the operating mechanism is self-cleaning and self-seating so that the tight closure of the valve is at all times assured.

I will describe only one form of valve and one form of valve operating mechanism, both embodying my invention, and will then point out the novel features thereof in claims.

In the accompanying drawing:

Fig. 1 is a view showing in vertical section one form of valve and operating mechanism therefor embodying my invention and in applied position with respect to a flush tank, the valve being in closed position.

Fig. 2 is a view similar to Fig. 1 showing the valve in open position.

Fig. 3 is a detail plan view of the gasket shown in Figs. 1 and 2.

My invention in its present embodiment is shown as applied to a conventional form of flush tank, the bottom of which latter is indicated at 15. Through this bottom extends a water supply pipe 16, the upper end of which is provided with an inwardly extending annular lip 17 to the under side of which is secured in any suitable manner a ring 18 formed of leather or any other suitable material and providing a seat for a valve. The area defined by the lip 17 constitutes a port indicated at 19 and through which water from the pipe 16 is admitted to the interior of the tank. Ducts 20 are formed in the pipe 16, and it is through these ducts that the water from the pipe is finally delivered to the tank.

Rising from the upper end of the pipe is an annular flange 21 on which is threaded a collar 22 having an inwardly extending annular lip 23 that is adapted to coact with the upper edge of the flange for securing certain parts of the mechanism in proper position on the pipe. A tube 24 rises from the pipe and is provided at its lower end with a head 25 of circular form and the marginal edge of this head is interposed between the flange 21 and the lip 23. The tube and head define a chamber indicated at 26, the lower end of which is closed by a diaphragm 27 corresponding in diameter to that of the head 25 and having its marginal edge interposed between the lip 23 and the head 25 so that when the collar 22 is screwed tightly down on the flange a fluid tight joint will be formed.

The diaphragm 27 is embraced at its opposite sides by plates 29 and 30, the former being of relatively small diameter so as to freely move within the head 25, and the latter being of relatively large diameter and designed to engage pins 30ª at the inner side of the flange 21 for limiting downward flexing of the diaphragm as will be clear from a consideration of Fig. 2. A stem 31 is extended through and secured to the diaphragm and plates, and this stem is of such length as to extend into the port 19 for operative connection to a valve 32 provided for controlling the passage of water through the port. This valve 32 in the present instance is constructed of glass and is of circular form. It is provided with a recess 33 in which a head 34 on the lower end of the stem 31 is slidably received. A collar 35 is rotatable on the stem 31 above the head 34 and this collar is threaded exteriorly for threaded engagement with the wall of the recess 33. Thus with the collar screwed into the recess it secures the head 34 against displacement upwardly from the recess to provide a permanent connection between the stem and the valve and to thereby operatively connect the diaphragm to the valve. As will be clear from a consideration of Figs. 1 and 2 the association of the collar 35 with the valve 32 is such as to allow a restricted vertical movement of the valve on the stem, and as the recess 33 and the head 34 are both circular in form, it will be evident that the valve is also capable of rotational movement on the stem. In permitting limited vertical movement of the valve on the stem, the pressure of the water against the valve will cause it to firmly seat upon the ring 18 when the diaphragm 27 is in the elevated position shown in Fig. 1, it being understood that the valve is movable independently of the stem 31, thus allowing the valve to freely respond to the water pressure and thereby firmly seat itself upon the ring 18 to effectively close the port. In permitting rotational movement of the valve on the stem, the valve under the action of the inrushing water will be oscillated, and with the latter in contact with the seat 18 such oscillating movement will function to remove from the seat and valve any solid matter, thereby further insuring the proper seating of the valve to effectively close the port. In constructing the valve of glass or any other similar material, the valve is rendered non-corrosive, and where the surface of the valve is highly polished, the deposit and retention of the solid matter upon its surface is greatly minimized, and with the further assurance of the proper seating of the valve to effectively close the port.

The space within the boundaries of the flange 21 and beneath the diaphragm 27 defines a chamber 36 to which water from the pipe 16 is admitted through the port 19, and from which water is discharged into the flush tank through the ducts 20. It will thus be understood that when the port 19 is opened, water is free to act against the diaphragm for moving the latter to the elevated position shown in Fig. 1, and in consequence of which the valve 32 is moved to closed position. The chamber 26 defined by the tube 24 is closed at its lower end by the diaphragm and at its upper end by a gasket 37 formed of leather or other suitable material and having the contour best illustrated in Fig. 3. This gasket is securely clamped at its marginal edge between a head 38 threaded on the upper end of the tube 24, and a packing member 39 formed of rubber or any other suitable material and embraced by an inverted cup member 40 which is threaded on the head 38.

The elements just described are formed axially with openings in which a rod 41 is slidable for movement within the chamber 26. The upper end of the rod carries a float 42, while its lower end is provided with a head 43 which is loosely fitted within the tube 24. The gasket 37 serves to provide a fluid tight seal about the rod 41 thus permitting the necessary freedom of movement under the action of the float 42 to perform the functions for which it is intended. This gasket is formed centrally with a concavo-convex portion that embraces the rod and being of flexible material its tendency is to hug the rod when the latter is at rest or when moving, the construction of the head 38 being such as to permit of a limited movement of the gasket under movement of the rod and to thus maintain its hugging action to effectively seal the rod against the escape of fluid from the chamber 26. It will be noted that the head 43 exceeds in diameter the opening in the head 38 so that the head 43 cannot move upwardly into engagement with the gasket 37 and thus injure the latter.

In operation, the valve 32 is normally held against the seat 18 by the water pressure in the pipe 16, and with the valve in closed position it will be understood that the tank has been previously filled to maintain the float 42 in the elevated position shown in Fig. 2. With the float 42 elevated, the rod 41 occupies a corresponding position so that only the head 43 is within the chamber 26. This chamber 26 may be filled with any suitable liquid or with air, and it will be understood that when the parts of the mechanism are assembled whatever fluid is contained in the chamber 26 is sealed against escape so that its volume is fixed.

With emptying of the tank in the usual manner, the float 42 descends to move the rod 41 downwardly within the chamber 26. Such projection of the rod into the chamber displaces the fluid contained therein and thus builds up a fluid pressure which acts against the diaphragm 27 to flex the latter to the position shown in Fig. 2. Under this movement of the diaphragm the stem 31 is lowered to move the valve 32 to lowered position thereby admitting water to the flush tank to again fill the latter. As the tank fills the float 42 is elevated and finally restored to its normal position. As it ascends the rod 41 is likewise elevated withdrawing it from the chamber 26 and thereby permitting a decrease of pressure in the fluid contained in the chamber to allow the diaphragm to respond to the pressure of water as well as the partial vacuum produced in the chamber 26 therebeneath and to thus be moved to elevated position so as to close the valve 32 with the final filling of the tank.

Although I have herein shown and described only one form of valve and one form of valve operating mechanism embodying my invention, it is to be understood that various changes and modifications may be made herein without departing from the spirit of the invention and the spirit and scope of the appended claims.

I claim:

1. In combination, a water inlet pipe having a flange thereon defining a chamber, a port in the pipe through which water is conducted to the chamber, ducts in the pipe through which water is discharged from the chamber, a diaphragm closing one end of the chamber, a tube defining a chamber adapted to contain a fluid, a head on one end of the tube, a collar on the flange for embracing the head and diaphragm to close one end of the tube, means for closing the opposite end of the tube, a stem connected to the diaphragm, a valve on the stem controlling said port, and means movable through said tube closing means for displacing the fluid in the tube chamber to set up a pressure against the diaphragm to move the stem and open the valve.

2. In combination, a flush tank, a normally closed valve for controlling the admission of water to said tank, means disposed vertically within the tank and defining a fluid tight chamber having a movable wall at its bottom operatively connected to the valve, a member movable downward in the chamber for placing the fluid therein under pressure to move said wall and open the valve, and a float in the tank connected to said member for moving the latter downward in the chamber upon emptying of the tank for opening the valve to refill the tank.

3. In combination, a flush tank, a normally closed valve for controlling the admission of water to said tank, means disposed vertically within the tank and defining a fluid tight chamber having a movable wall at its bottom operatively connected to the valve, a member extending into and loosely fitted in the chamber so that when moved downward into the chamber it functions to displace the fluid therein and set up a pressure sufficient to move said wall and open said valve, and a float in the tank for moving the member vertically in the chamber.

4. In combination, a flush tank having a water inlet pipe provided with an outlet port, a valve movable by the water pressure to close the port, a tube on said pipe providing a chamber, a diaphragm operatively connected to the valve and closing the lower end of the tube, means for closing the upper end of the tube, a member movable through said means and downward within said tube for placing the fluid in said chamber under sufficient pressure to move the diaphragm and open said valve, and a float on the member for actuating the latter with emptying of the tank.

5. In combination, a water inlet pipe, a diaphragm, means on said pipe co-acting with the diaphragm to define a chamber having an inlet port and a valveless outlet port both of which are at one and the same side of the diaphragm, a valve for controlling the inlet port, means for operatively connecting the valve to the diaphragm, the diaphragm normally urging the valve to close the inlet port, and means for subjecting the diaphragm to fluid pressure sufficient to flex the diaphragm and open the valve.

ANDREW C. BRADSHAW.